UNITED STATES PATENT OFFICE.

ERNST HUG, OF GRENZACH, GERMANY, ASSIGNOR TO HOFFMANN-LA ROCHE CHEMICAL WORKS, OF NEW YORK, N. Y., A CORPORATION OF NEW YORK.

THERAPEUTIC COMPOUND AND PROCESS OF MAKING THE SAME.

1,069,954. Specification of Letters Patent. Patented Aug. 12, 1913.

No Drawing. Application filed February 8, 1913. Serial No. 746,988.

*To all whom it may concern:*

Be it known that I, ERNST HUG, a citizen of Switzerland, and a resident of Grenzach, Baden, Germany, have invented a certain new Therapeutic Compound and Process of Making the Same, of which the following is a specification.

My invention relates to therapeutically valuable compounds containing alkaloids of the opium group and more specifically to compounds in which double salts of alkaloids of the opium group are produced with mono-basic acids.

It has been observed that with respect to narcotic and toxic effects, mixtures of alkaloids of the opium group, for instance a mixture of morphin and narcotin, surpass morphin alone. In order to take advantage of this observation for therapeutic purposes the two alkaloids, morphin and narcotin, were brought into the condition of double salts by the use of di- and poly-basic acids. The best results in such cases were observed to take place when the double salts contained the two alkaloids in about equal parts. The discovery underlying the present application is that of a double salt of the opium group of alkaloids based upon the use of mono-basic acids as against double salts of the di- or poly-basic acids. The process producing these salts of mono-basic acids of the opium group of alkaloids is new in itself and results in the production of a crystalline double salt not heretofore known to science.

The process constituting my invention consists, speaking generally, in evaporating solutions of mixtures of both salts derived from halogen acids, for example in equi-molecular amounts, and in crystallizing out the double salt from dilute alcoholic solutions, or from alcohol to which ether has been added. The double salts separate out in the form of beautifully crystallized bodies easily soluble in cold water, more difficultly soluble in alcohol and insoluble in ether.

The following examples illustrate the process more fully, it being of course understood that they are to be regarded merely as illustrative of my invention:

Example I: 375 grams of crystallized morphin hydrochlorid and 449 grams of dried narcotin hydrochlorid are dissolved in 5000 cubic centimeters of water and the solution, if necessary, is filtered. The solution is now subjected to a strong vacuum and then treated with an equal volume of alcohol. It is then cooled, whereupon the salt is thrown down in the form of uniform, short prisms which differ markedly in appearance both from the bundles of capillary, needle-like crystals of the morphin hydrochlorid and from the shiny, leaf-like crystals of the narcotin-hydrochlorid. The double compound thus obtained becomes yellow in color and melts without foaming at 200° C. The morphin-narcotin-hydrochlorid is very easily soluble in cold water, difficultly soluble in alcohol and insoluble in ether.

The morphin determination of the product may be made according to the method of Anneler (*Archiv für Pharmazie*, 1912, vol. 250, p. 186). Analysis of the hydrated salt gave the following values:

| | Found. | Computed. |
|---|---|---|
| Morphin | 37.05 | 36.97 |

Example II: 335 grams of codein hydrochlorid and 449 grams of narcotin hydrochlorid are dissolved in 6000 cubic centimeters of water, the solution thus obtained is concentrated and brought over to an alcoholic solution by repeated evaporizations with alcohol. The still hot, concentrated alcoholic solution is treated with ether until it begins to become cloudy; the double salt then crystallizes out into uniform prisms. The melting point of the double salt is different from that of the molecular mixture of the components. The mixture begins to decompose at 180 to 185° C. while the double compound decomposes, becoming liquid, at 200° C. The codein-narcotin-hydrochlorid is very easily soluble in water, difficultly soluble in alcohol and insoluble in ether.

For the purpose of analysis a water solution of the salt was treated with ammonia and the precipitated narcotin weighed. Computed as water free substance the following values were obtained:

| | Found. | Computed. |
|---|---|---|
| Narcotin | 51.53 | 52.62 |

Example III: 285 grams of water free morphin and 413 grams of narcotin were dissolved in two liters of normal hydrobromic acid. The water solution was made alcoholic and, after being moderately concentrated, was treated with ether. The double salt separated out in uniform, needle-like crystals containing two molecules of water of crystallization. The morphin-narcotin-hydrobromid formed dissolves rather easily in cold water and very easily in hot water; it is difficult to dissolve it in cold alcohol but slightly less difficult in hot alcohol; it is insoluble in ether.

The double salt has no sharply defined melting point but begins to soften, meanwhile becoming brown in color, at 170° C. The water determination gave the following results:

|  | Found. | Computed. |
|---|---|---|
| Water ($2H_2O$) | 4.14% | 4.02% |

The determination of morphin, free of water, is accomplished as in Example I.

|  | Found. | Computed. |
|---|---|---|
| Morphin | 32.6% | 33.2% |

It will be seen from the examples that the halogen acids have been used. They are of particular importance and value because the salts derived therefrom on account of their capability of being readily dissolved, absorbed and easily handled adds to their therapeutic utility. The products produced by these examples are chemical combinations, each comprising two of the alkaloids of the opium group and each one of which apparently serves to strengthen and modify the other.

By the expression "Opium group" as used in this specification and in the claims I intend to refer to the series of opium alkaloids of which morphin may be treated as representative, and of which codein, thebain, narcotin, narcein, papaverin are some of the better known members.

What I claim is:
1. Monobasic acid double salt of alkaloids of the opium group.
2. Halogen acid double salt of alkaloids of the opium group.
3. The process of producing a monobasic acid double salt of alkaloids of the opium group, which consists in crystallizing said double salt from an alcoholic solution of a mixture of two monobasic acid salts of said alkaloids.
4. The process of producing a halogen acid double salt of alkaloids of the opium group, which consists in crystallizing said double salt from an alcoholic solution of a mixture of two halogen acid salts of said alkaloids.
5. The process of producing a monobasic acid double salt of alkaloids of the opium group, which consists in forming a water solution of a mixture of two monobasic acid salts of alkaloids of the opium group and adding alcohol to said solution to crystallize out the monobasic acid double salt of said alkaloids.
6. The process of producing a halogen acid double salt of alkaloids of the opium group, which consists in forming an alcoholic solution of a mixture of two halogen acid salts of alkaloids of the opium group and crystallizing out from said solution the halogen acid double salt of said alkaloids.

In witness whereof I have hereunto set my hand in the presence of two subscribing witnesses.

ERNST HUG.

Witnesses:
HEINRICH KUBLI,
PETER METZGER.